US006367181B1

(12) United States Patent
Skoog

(10) Patent No.: US 6,367,181 B1
(45) Date of Patent: Apr. 9, 2002

(54) GOLF AD

(76) Inventor: Jason Lee Skoog, 201 Park Ave. West, Big Lake, MN (US) 55309

( * ) Notice: Subject to any disclaimer, the term of this patent is extended or adjusted under 35 U.S.C. 154(b) by 0 days.

(21) Appl. No.: 09/386,236

(22) Filed: Aug. 31, 1999

(51) Int. Cl.[7] ................................................ B62D 25/06

(52) U.S. Cl. .............................. 40/591; 40/606; 40/607

(58) Field of Search .......................... 40/606, 607, 591, 40/124.2, 734, 737, 771, 775, 776, 649, 654.01, 661; 52/786.13; 280/DIG. 5

(56) References Cited

U.S. PATENT DOCUMENTS 5,190,340 A * 3/1993 Nuscher .................... 296/99.1
5,697,176 A * 12/1997 Kuni, Jr. et al. .............. 40/591

FOREIGN PATENT DOCUMENTS

AT 214673 * 9/1960
DE 1516625 * 7/1978 .................. 40/606
FR 2575380 * 7/1986 .................. 40/152

* cited by examiner

*Primary Examiner*—Cassandra H. Davis
(74) *Attorney, Agent, or Firm*—Patterson, Thuente, Skaar & Chrisstensen

(57) ABSTRACT

A golf cart display apparatus consisting of a rigid transparent material in which superior, graphic golf course maintenance reminders may be placed in a picture type frame. The device is to be sized to fit between or on the upstanding roof support posts on both sides of a motorized golf cart. The display will also be used by local and national merchants for the purpose of advertising their products and services to golfers in the cart and also on the course.

14 Claims, 2 Drawing Sheets

GOLF AD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

In the game of golf, it is very important for the golf course to be in pristine condition. The best method for this to occur is if the individual golfer makes it his or her responsibility to help the golf course management maintain the golf courses eloquent environment.

In the past, various methods have been used in an attempt to remind the individual golfer to do his or her part in assisting the golf course management in maintaining a high quality playing field. Probably the most common way of doing this is to put little, bullet point reminders on the scorecard. This method has been used for years, however it is not without it's shortcomings. Specifically, the small bullet points on the scorecard are generally on the side opposite of the side in which the score is being kept. While riding in a motorized golf cart, the scorecard clips onto the flat surface of the steering wheel with the scoring area facing up. The individual golfer is highly unlikely to flip the scorecard over, thus allowing the bullet point reminders to be seen.

Other methods have been tried in the past such as having a billboard type sign near the first teeing area for the first hole. While this sign does convey the information to golfers, it is so very early in the round that very shortly thereafter the individual golfer has forgotten what the sign had said.

Another method that may be tried us illustrated in U.S. Pat. No. 5,697,176 of Kuni, Jr., et al. of December 1997. The Kuni, Jr., et al. patent shows a device that would fit just above or on the cawl on the front of a motorized golf cart. This device is used for the purpose of displaying individual hole information to golfers riding in the cart. While this may be an area in which said reminders may be displayed, it is only effective for those individuals riding in the cart and would be of such a diminutive size that those individuals in a playing group not riding in the cart could not see them. Also, if those individuals riding in the cart fail to look down at the device, they too would fail to get the intended message.

Another method would be for the golf course ranger or ambassador to remind the individuals to do their part in maintaining the golf course. This method would prove to be meddlesome, condescending and impractical.

Thus, there exists a continuing and heretofore unaddressed need for an improved method and apparatus for displaying to an individual golfer the friendly little reminders to do their part in maintaining the pristine conditions of the golf course. The apparatus should be placed in a position on the motorized golf cart that does not interfere with the golfer, but should be seen every time a golf club is taken or replaced from a golf bag on the cart. The device should be rigid, weatherproof, easily adapted for varying widths of different golf carts, have panels large enough to be seen by someone not riding in the cart and have an opposing panel for the strategic placement of advertising in a display panel of a substantial size. It is to the provision of such a method and apparatus that the present invention is primarily directed.

BRIEF SUMMARY OF THE INVENTION

The present invention, of one preferred embodiment thereof, comprises a unique golf cart display panel expressing messages to golfers. The device consists of two pieces of elongated rigid transparent material generally rectangular in shape, encompassing pieces of a different firm rigid material, which is arranged into two picture frame type shapes. This device is all held together by fasteners of some type that extends through all three pieces of material, meaning the two pieces of rigid transparent material and the firm rigid materials used to make the picture type frames.

The apparatus is to be attached to a motorized golf cart that has upstanding roof support posts. The device may be attached using industrial strength cable ties, clamps or other binding types of material. The preferred location of the attachment of the device is on the rear of the cart, just below the roof. However, it also may be placed lower or on the front of the motorized golf cart thus allowing it to be seen by those golfers not riding in the cart.

Thus, this present invention will meet and overcome the unaddressed need of the golf course management to better convey the message of the individual golfers' responsibility to help maintain the pristine conditions of the golf course. Specifically, it will allow the golf course management to convey their message in a size in which all golfers, not only those riding in a cart will be able to receive said message. Additionally, there is also a space of a substantial size in which local or national advertisers may display a message to golfers also. These and other objects, feature and advantages inherent in this invention will become more apparent upon review of the detailed descriptions set forth below when taken in conjunction with the accompanying drawings, a brief description of which follows.

DETAILED DESCRIPTION OF THE INVENTION

Figure 1:
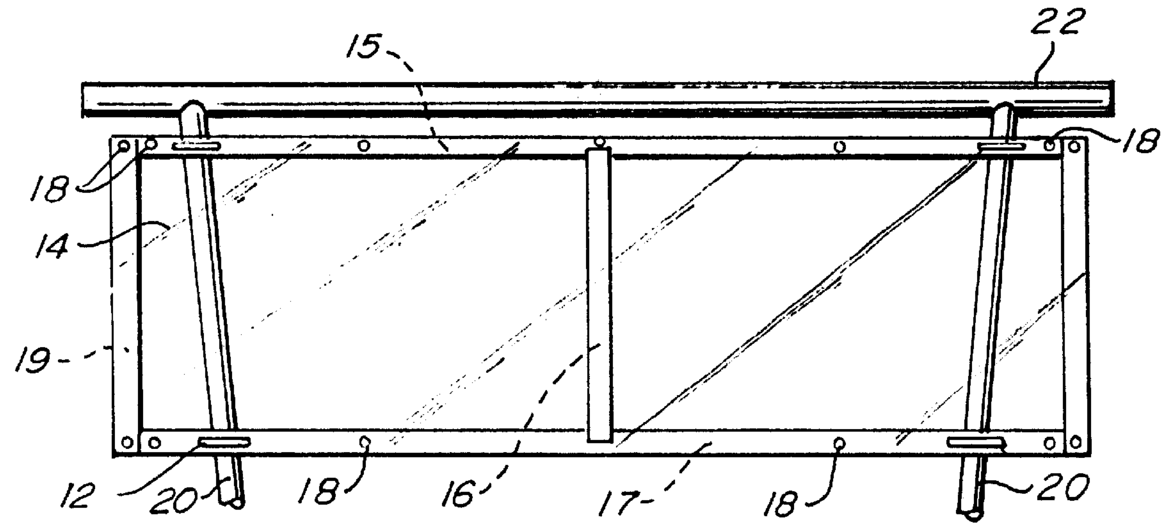
FIG. 1 is a perspective view showing the Golf Ad invention mounted on a typical motorized golf cart having upstanding roof support posts.
Figure 2:
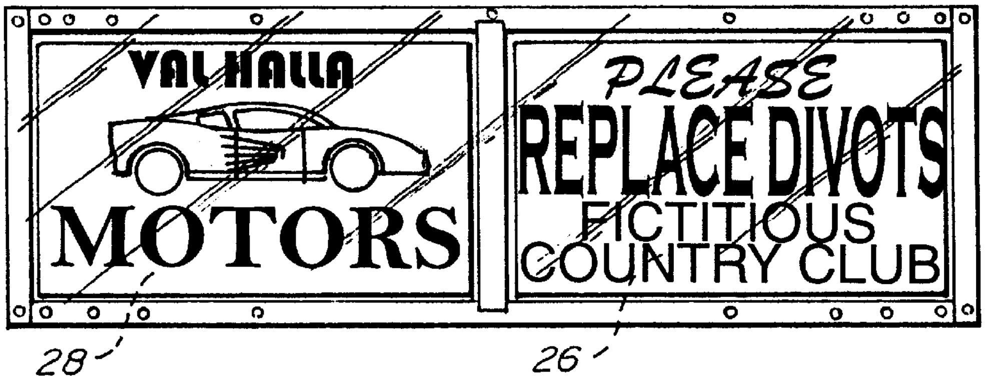
FIG. 2 is a perspective view illustrating the Golf Ad display panel that embodies principals of the invention in one preferred form.

Referring now in more detail to the drawings, in which like numerals refer to like parts throughout the several views, FIG. 1 illustrates a prospective view that embodies the present invention in a preferred form mounted on a standard motorized golf cart. The Golf Ad consists of two pieces of rigid transparent material 14, which encompasses pieces of a firm rigid material. 15,16,17,19 The firm rigid materials 15,16,17,19 shall be arranged in a manner such that the materials 15,16,17,19 produces two generally rectangular shaped picture type windows. The two pieces of rigid transparent material 14 and the pieces of firm rigid material 15,16,17,19 are held tightly together by a series of fasteners 18 which may be screws, rivets or other such fasteners. The Golf Ad apparatus is the securely fastened with industrial strength cable ties, clamps or other such fastening devices 12 to the upstanding roof support posts 20 that attach to the roof 22 of any standard motorized golf cart. FIG. 2 is a perspective illustration of said Golf Ad device that is not attached to a motorized cart but instead illustrates the purpose of said invention. The Golf Ad apparatus is to be used to display golf course reminders 26 to golfers on the golf course whether in a motorized golf cart or not. Also, there is a space provided 28 for the intention of allowing local or national merchants to advertise their products or services. The view in FIG. 2 may be considered a front view or a back view because the opposing sides are symmetrical which in essence allows for four separate picture type frames to be viewed.

Figure 3:
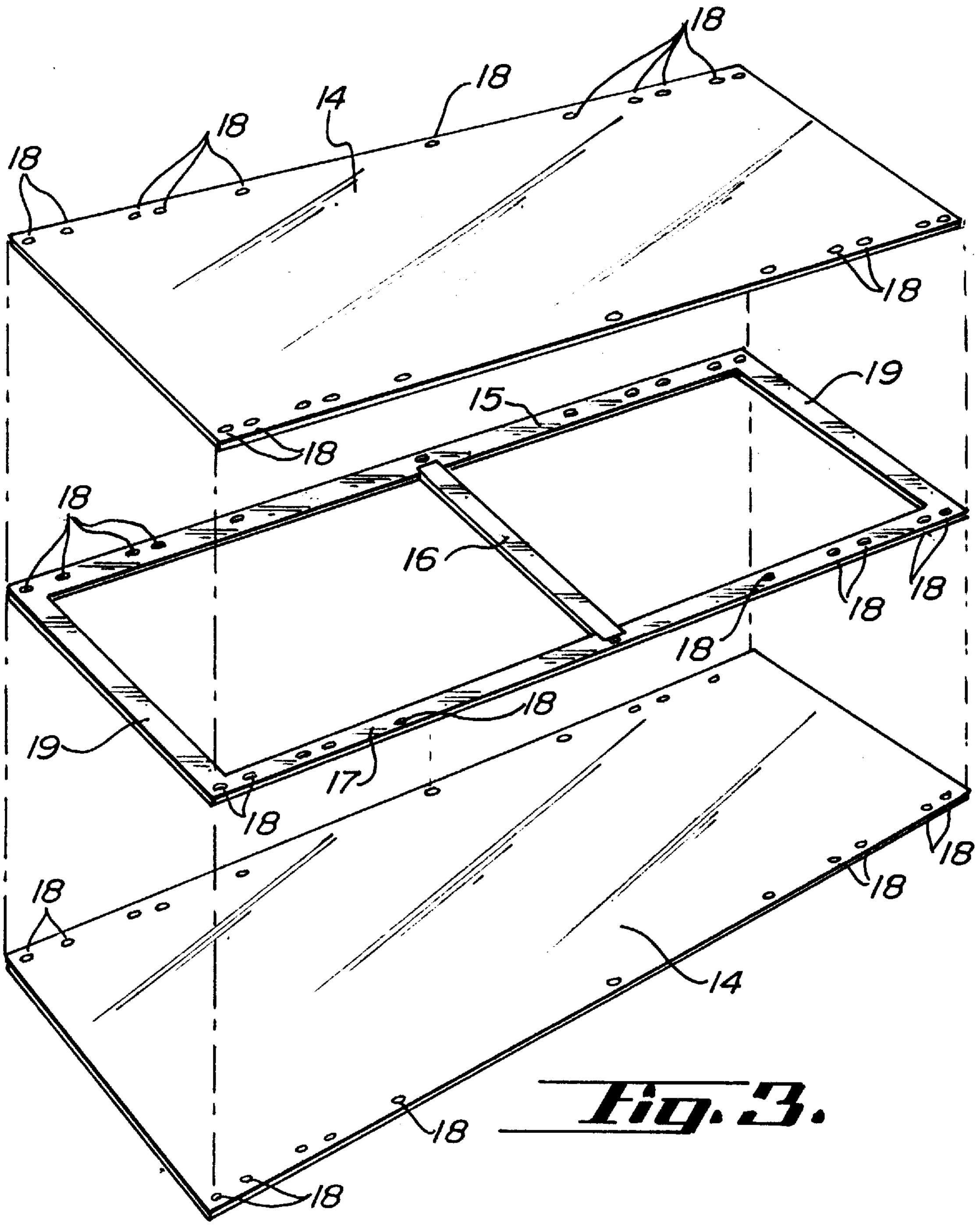
FIG. 3 is an exploded view that illustrates the manner in, which said Golf Ad invention is assembled.

The drawing in FIG. 3 is an exploded view, which illustrates the invention in the above said manner. The first and last section of this exploded view is an illustration of the rigid transparent material 14 with holes drilled through at precise pre-designed locations to accommodate the fasteners 18 which hold the device together and the fastening devices 12 which hold the Golf Ad device to the upstanding roof support posts 20. The first and last sections are the exact same rigid transparent material 14 with the holes having been drilled in the exact same locations so as to make it insignificant to label one the front or back. The middle section of FIG. 3 illustrates the manner in which the firm rigid material 15,16,17,19 is arranged so as to make the picture type frames. The firm rigid material 15 and 17 should be notched so that another piece of firm rigid material 16 may be placed in between them so as to make a divider between the two end pieces of firm rigid material 19. The holes for the device fasteners 18 and the upstanding roof support fasteners 12 are in the precisely same location on the pieces of firm rigid material 15,16,17,19 as on the front and back sections of the rigid transparent material 14. When assembled together the invention forms a rectangular sandwich like shape in which the firm rigid materials 15,16,17,19 are surrounded by the two pieces of rigid transparent material 14 and held together by the fasteners 18 indicated by the hole locations. The fasteners 18 should be of a nature in which the firm rigid material 19 may be easily removed and replaced so that the golf course maintenance reminders and the advertisements may be changed rapidly.

The present invention has been described herein in terms of preferred embodiments and methodologies. It will be obvious to those of skill in this art, however, that various, additions, deletions, and modifications might well be made to the illustrated embodiment within the scope of the invention. For example, the Golf Ad is shown mounted at the top of the upstanding roof support posts on the back of a motorized golf cart. Clearly, the Golf Ad invention could be mounted on the bottom of the upstanding roof support posts on the back as well as on the front of the golf cart. In addition, there could be two middle separators of the picture type framing thus leaving a window in between. Also, the Golf Ad device could be attached directly to the upstanding roof support posts without the use of cable ties or clamps, however that would require drilling holes in the upstanding roof support posts. These and other additions, deletions, modifications might well be made to the illustrated embodiments without departing from the spirit and scope of the invention as set forth in the claims.

I claim:

1. A golf cart display panel to be used for displaying graphic golf course maintenance reminders and advertising to golfers on a golf course which is mounted on a motorized golf cart having upstanding support posts, said golf cart display panel comprising;

an elongated body formed by a front, middle, and back section;

said front and back sections being identical rigid transparent material having holes drilled through at precise predetermined locations to receive one or more fastening devices for adjoining said display panel to said support posts of the golf cart;

said middle section including a firm rigid material that is arranged into two picture frame type windows which share a top and bottom piece of said firm rigid material with pieces of firm rigid material at opposed ends, with firm rigid material acting as a divider of said picture frames, with holes drilled through the materials so as to match up precisely with the holes drilled in said rigid transparent material; and means for fastening said front, middle, and back sections firmly together in a manner in which said front and back pieces of rigid transparent material sandwich said middle section of firm rigid material.

2. A golf cart display panel as claimed in claim 1 which is generally rectangular in nature having top and bottom sides joined by opposed ends.

3. A golf cart display panel as claimed in claim 1 has a front view that is identical as a back view.

4. A golf cart display panel as claimed in claim 1 in which said firm rigid material on the opposed ends may be easily removed and replaced.

5. A graphical display panel for a golf cart comprising:

a first transparent panel, second transparent panel, and a framing section disposed between the first transparent panel and second transparent panel for defining at least one display window, a plurality of apertures formed in each of the first transparent panel, second transparent panel and framing section, the apertures being in substantial alignment to receive fastening devices for adjoining the display panel to the golf cart, and a plurality of fasteners for operably adjoining the first transparent panel, the framing section, and the second transparent panel.

6. The graphical display panel of claim 5, wherein the framing section includes two picture type windows.

7. The graphical display panel of claim 5, wherein the fasteners are selected from the group consisting of industrial strength cable ties, clamps, screws and rivets.

8. The graphical display panel of claim 5, wherein the fasteners are screws or rivets.

9. The graphical display panel of claim 5, wherein the first transparent panel and second transparent panel comprise a rigid material.

10. A method for displaying advertisements on a golf cart comprising:

providing a golf cart having a plurality of roof support members, providing a display panel having a first longitudinal surface, a framing section, a second longitudinal surface and a plurality of apertures therethrough, wherein the framing section is disposed between the first longitudinal surface and second longitudinal surface, thereby forming at least one display window, placing advertising material within the display window, and fastening the display panel to the roof support members of the golf cart, wherein one of the first longitudinal surface and second longitudinal surfaces is in contact with the roof support members.

11. The method for displaying advertisements on a golf cart of claim 10, wherein the framing section includes two picture type windows.

12. The method for displaying advertisements on a golf cart of claim 10, wherein the display panel is fastened to the roof support members of the golf cart with one or more fastening devices selected from the group consisting of cable ties, clamps, screws and rivets.

13. A graphical display panel for a golf cart comprising:

a first transparent panel, a second transparent panel, a framing section disposed between the first transparent panel and second transparent panel for defining at least one display window, one or more fastening devices for operably adjoining one of the first transparent panel and the second transparent panel to a golf cart, wherein the framing section is disposed one of inwardly and outwardly from the golf cart, and a plurality of apertures formed in each of the first transparent panel, second transparent panel and framing section, the apertures being in substantial alignment to fasteners for adjoining the first transparent panel, second transparent panel and framing section.

14. The graphical display panel of claim 13, wherein the fasteners are screws or rivets.

* * * * *